Oct. 10, 1967    A. J. ALLEGRETTI    3,346,053
LAWN EDGER
Filed Feb. 12, 1965
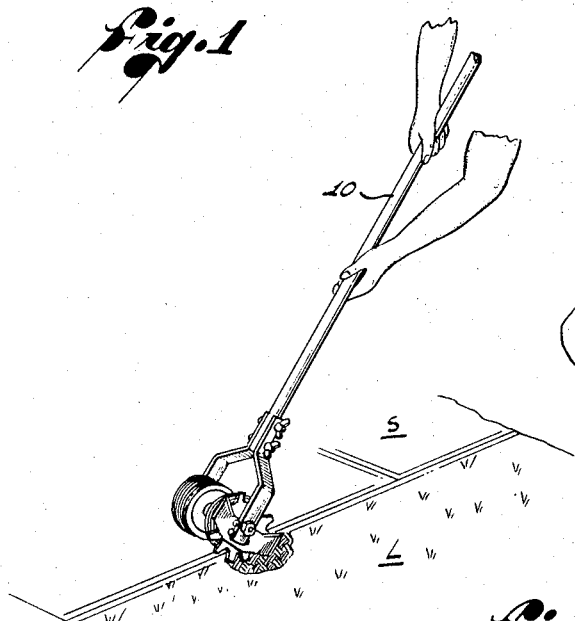
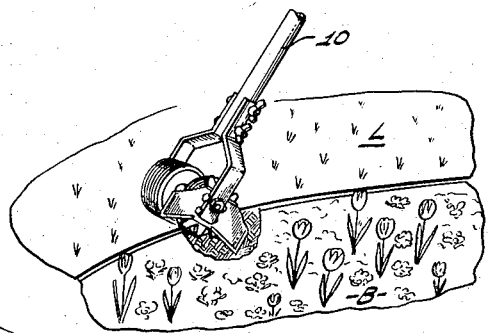
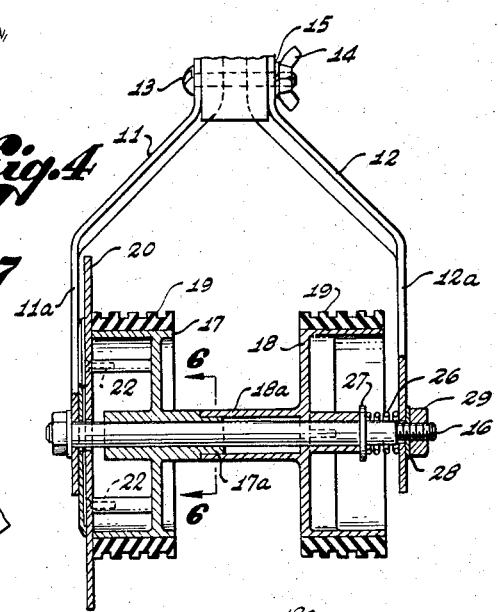
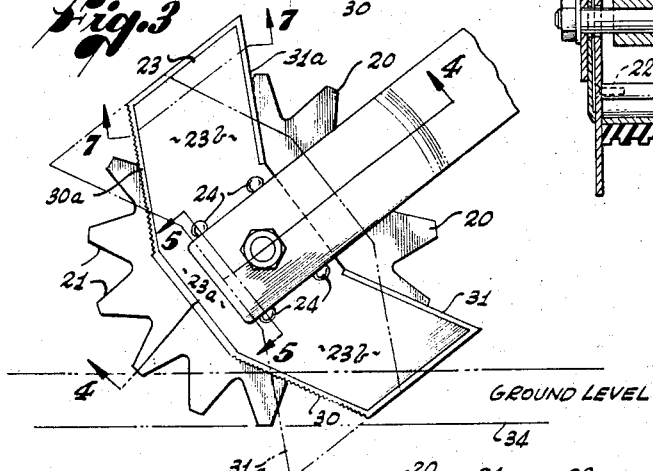
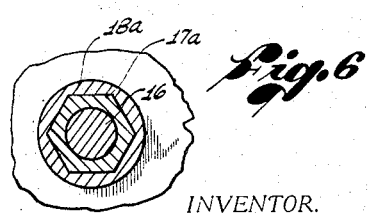
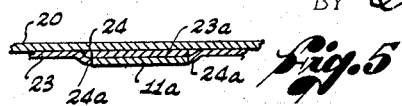
INVENTOR.
ALBERT J. ALLEGRETTI
BY Fulwider, Patton, Rieber
Lee, and Utecht
ATTORNEYS United States Patent Office 3,346,053
Patented Oct. 10, 1967

3,346,053
LAWN EDGER
Albert J. Allegretti, 4644 Halbrent Ave.,
Sherman Oaks, Calif. 91403
Filed Feb. 12, 1965, Ser. No. 432,366
2 Claims. (Cl. 172—16)

ABSTRACT OF THE DISCLOSURE

A wheel supported lawn edger including a star-shaped rotary cutter, drivable by rolling movement of the wheels, and a non-rotary fixed blade detachably secured to the wheel supporting frame in shearing relationship to the rotary cutter. The fixed blade is selectively positionable in either of a pair of positions to vary the depth of soil penetration for either trenching or edging under manual control of an elongated handle and in both positions extends radially beyond the rotary cutter to sever grass that is skipped by the teeth of the rotary cutter.

This invention relates to implements for the care of lawns and, more particularly, to an edger that is adapted for edging a lawn adjacent sidewalks or the like, or for simultaneously edging and trenching a lawn edge adjacent a flower bed or the like.

An important object of my invention is to provide a lawn edger of the manually propelled type that will more efficiently perform the lawn edging function, and which will also serve as a trenching instrument to more effectively edge a lawn around flower beds or the like. In my invention, I utilize a fixed blade that works in conjunction with a rotary cutter, the fixed blade being adapted to occupy two different positions with respect to the rotary cutter. In both of these positions, the fixed blade has a greater effective length than the radius of the rotary cutter. The rotary cutter overlaps and has a shearing action against a portion of the edge of the fixed blade and another portion of the edge of the fixed blade, extending beyond the radius of the rotary cutter, acts as a knife blade following in the path of the shearing action. Thus, the fixed blade cuts grass that is skipped in the teeth of the rotary cutter. When this edger is used on sidewalks or the like, the fixed blade is in a first position in which its knife action follows the shearing action to about the same depth as the shearing action. When it is desired to edge around flower beds or the like, the fixed blade occupies a second position in which its knife action works to a greater depth than the shearing action occurring between the fixed blade and the rotary cutter. Thus, in this second position, the fixed blade trenches more deeply than the working depth of the rotary cutter and gives a neater, longer lasting, clean edge to the flower bed.

Other objects and advantages of my invention will be apparent from the following description of a presently preferred embodiment thereof when taken in conjunction with the annexed drawing, it being understood that the drawing is illustrative rather than to be taken in a limiting sense.

FIGURE 1 is a perspective view showing the lawn edger of my invention in use for edging adjacent a sidewalk;

FIGURE 2 is a perspective view showing the edger in use for trimming around a flower bed;

FIGURE 3 is a partial side elevational view;

FIGURE 4 is a sectional view taken through the axis of the supporting wheels of the edger;

FIGURE 5 is a partial sectional view taken on the line 5—5 of FIGURE 3;

FIGURE 6 is a sectional view taken on the line 6—6 of FIGURE 4; and

FIGURE 7 is a sectional view on the line 7—7 of FIGURE 3, showing details of the fixed blade configuration.

The edger comprises an elongated handle 10 which may be of wood or metal and which has a pair of arms 11 and 12 secured to its lower end. The arms 11 and 12 are preferably made of strap metal and may be secured to the handle 10 by a pair of bolts 13, each passing through aligned bores of the straps and also through a bore in the handle, and secured in place by means of wing nuts 14, beneath each of which a washer 15 may be placed. As is shown in FIGURE 4, the arms 11 and 12 diverge outwardly away from the handle 10, terminating in a pair of spaced parallel sections 11a and 12a.

The extremities of the arms 11 and 12 are provided with a pair of aligned bores which receive the opposite threaded ends of an axle shaft 16. Between the arms 11 and 12 this axle shaft provides plain bearing support for a pair of wheels 17 and 18. These wheels are preferably die cast and each is provided with a tire 19. In order to key the pair of wheels together for rotation, the hub of the wheel 17 is formed with a hexagonal projection 17a and the hub of the wheel 18 at one end is formed with a complementary hexagonal socket 18a, receiving the portion 17a of the other wheel.

A rotary cutter 20 is secured to the outwardly facing side of the wheel 17. As is best seen in FIGURE 3, this cutter is generally star-shaped in configuration to form a series of cutting edges or teeth 21. Referring to FIGURE 4, the rotary cutter 20 is mounted coaxially with the wheels of the device and is secured to the wheel 17 by means of a plurality of screw type fasteners 22 that are circularly spaced apart and are engageable in tapped blind bores formed in the die cast wheel 17. Thus, the rotary cutter 20 is driven by the movement of the wheels 17 and 18.

A blade 23 is detachably connected to the inside of the arm 11, overlying the rotary cutter 20. As is shown in FIGURE 4, this blade 23 is formed with an opening through which the axle shaft 16 extends. A central portion 23a of the blade is substantially rectangular in configuration and is formed with four integral ears 24 that are formed by outstruck portions of the metal of which the blade 23 is made. As is shown in FIGURE 3, the ears 24 are arranged in two confronting pairs and as shown in FIGURE 5, the confronting edges of the ears define parallel straight edges 24a so spaced as to snugly receive therebetween the extremity of the arm 11. The blade 23 is thus securely indexed in the desired relationship to the rotary cutter 20 but, upon the shaft or axle shaft 16 being withdrawn, can be slid off the end of the arm 11 when it is desired to re-position the blade.

In order to keep the rotary cutter 20 and the fixed blade 23 in contact with one another for the proper shearing action of their edges, I provide a biasing means in the edger, best seen in FIGURE 4. Thus, a coil spring 26 is coaxially mounted on the axle shaft 16 between the inside of the arm 12 and a washer 27 that bears against an end of the hub of the wheel 18. A pair of washers 28 are coaxially mounted on opposite ends of the axle shaft 16, outside of the arms 11 and 12, under nuts 29 that are threadedly secured to the extremities of the axle. Accordingly, the nuts 29 provide fixed abutments between which the spring 26 acts to bias one side of the rotary cutter 20 against the inside of the fixed blade 23.

Referring to FIGURE 3, it will be seen that the blade 23 is preferably symmetrical, in order for the edger to reversible. Thus, the blade has a pair of wing portions 23b on opposite sides of the central portion 23a, the wings being angularly related to one another and symmetrical about an axis that bisects the angle included between the wings. On the outwardly facing surface of the blade 23, the wing portions 23b each has parallel edges 30 and 31 formed with a taper 30a and 31a, respectively. The taper 30a is serrated with teeth 30b. Either a serrated edge 30 or an unserrated edge 31 may be the foremost or leading edge of the blade.

Referring to FIGURE 7, it will be seen that the inside surface of the blade 23, along each of the edges 30 and 31, is formed with a land 32 which is surface ground to define a sharp cutting edge at its junction with the edges 30 and 31. Referring to FIGURE 4, it will be seen that the rotary cutter 20 is biased against the lands 32, the lands thus serving to minimize the area of frictional contact between the cutter and the blade. As is evident, such wear as occurs on the lands 32 serves to preserve the sharpness of the edges 30 and 31 of the blade 23.

FIGURE 1 shows the use of the edger in trimming the grass of a lawn L that is bounded by a sidewalk S. In this situation, the blade 23 is mounted with the wings thereof swept back with reference to the direction in which the edger is pushed. Thus, the serrated edges 30 of the blade 23 are the leading edges of the blade and either one of the serrated edges is available to do the work, depending upon the direction in which the edger is pushed.

Similarly, FIGURE 2 illustrates the use of the edger in trimming the lawn L adjacent a flower bed B. Here, the blade 23 has been reversed from the position of FIGURE 1 and the wing portions of the blade are now swept forward with respect to the direction in which the edger is being pushed. Accordingly, the unserrated edges 31 are now the leading edges of the blade 23 and either one of these unserrated edges is available to do the work, depending upon the direction in which the edger is pushed.

Referring to FIGURE 3, it is apparent that the wheels 17 and 18 of the edger rest on the indicated ground level. The rotary cutter 20, being of greater diameter than the wheels, will penetrate the ground to the level indicated by the line 34, which is at a tangent to the overall diameter of the rotary cutter. When the fixed blade 23 is in the solid outline position shown (for edging adjacent a sidewalk as in FIGURE 1) a portion of one serrated edge 30 lies radially beyond the radius of action of the rotary cutter 20. Some, but not all of the grass will be cut between the teeth 21 of the rotary cutter 20 and that portion of the serrated edge 30 lying within the radius of the rotary cutter. However, when the handle 10 is in driving position, e.g., 45° to the ground, since the serrated edge 30 extends beyond the radius of the rotary cutter 20, and to about the same depth, i.e., the line 34, as the rotary cutter, such grass as is skipped by the teeth 21 of the rotary cutter is cut by the portion of the serrated edge 30 beyond the radius of the rotary cutter. Thus, the edger achieves a neater groove in which substantially all of the grass has been cut rather than merely such grass as has been caught between the rotary cutter and the fixed blade.

In order to change the position of the fixed blade 23, the nut 29 at the end of the axle shaft 16 adjacent the fixed blade is removed, after which the axle shaft can be withdrawn sufficiently to allow the fixed blade to be slid off of the arm 11 and then slid back on after the reversal of the fixed blade has been made. The axle shaft and the nut are then reassembled. Now let it be assumed that the fixed blade is in the edging position shown in FIGURE 2 and also shown by the dotted outline position of FIGURE 3, for edging adjacent the flower bed B. As is apparent from FIGURE 3, a greater length of an unserrated edge 31 extends outwardly beyond the periphery of the rotary cutter 20 than was true of the unserrated edge 30. As before, that portion of the unserrated edge 31 extending radially beyond the periphery of the rotary cutter will act to sever the grass missed or skipped by the teeth of the rotary cutter. Furthermore, when the handle 10 is in driving position, the unserrated edge 31 penetrates the ground to a greater depth than the penetration to the line 34 achieved by a serrated edge. Thus, the unserrated edge 31 knifes through and cuts not only such grass as has been skipped by the teeth of the rotary cutter, but also knifes through and cuts grass and roots which are wholly beyond the radius of action of the rotary cutter. I have found that the deep penetration of an unserrated edge 31 of the fixed blade is practical in edging adjacent a flower bed without entailing undue exertion although, perhaps, too much force would be required for some people if the edger were used adjacent a sidewalk when the fixed blade is in the position shown in FIGURE 2.

While I have shown my invention embodied in a dual-wheeled edger, it will of course be appreciated that it may also be incorporated in a single-wheeled edger. Also, although I have shown the fixed blade 23 of symmetrical configuration especially adapted for reversal of direction of movement of the edger, it will be appreciated that one wing portion 23b could be removed but then the edger would be adapted for actuation only in a single direction. It will also be obvious to those skilled in the art that the invention is not limited to the particular configurations of rotary cutter and fixed blade and edges herein specifically disclosed and described, but that other configurations may also be successfully employed. While I have described the preferred embodiment of my invention, I do not mean to be limited to the details herein set forth but only by the spirit and scope of the following claims.

I claim:
1. A lawn edger comprising:
   an elongated handle;
   a ground-engageable wheel mounted on a lower end of said handle;
   a rotary cutter drivably engaged by said wheel and having teeth extending beyond the periphery of said wheel to penetrate below the surface on which said wheel is supported;
   and a blade detachably connected to said edger in a fixed position contiguous to one side of said rotary cutter, said blade having a pair of spaced cutting edges either of which is optionally usable by adjustment of said detachable blade to a first and a second position relative to said cutter, said blade being disposed on said edger to be positionable, by movement of said handle to a driving position, to penetrate the ground to a depth below the surface on which said wheel is supported, said blade in said first position and when said handle is in said driving position, having a first one of said edges disposed to penetrate the ground to approximately the same depth as the teeth of said cutter, said blade, in said second position and when said handle is in said driving position, having a second one of said edges disposed to penetrate the ground to a depth greater than the depth to which said teeth of said rotary cuttter penetrate the ground, both of said cutting edges of said blade having a portion within the radius of action of said teeth of said cutter to be disposed in shearing relationship with said teeth of said cutter, both of said cutting edges of said blade having another portion extending beyond the radius of action of said teeth of said cutter to sever material skipped by said teeth of said cutter.

2. A lawn edger comprising:
   an elongated handle;
   a pair of arms secured to a lower end of said handle to provide a framework for a wheel for said edger;
   an axle shaft having opposite ends detachably connected to said arms;
   a wheel journalled on said shaft between said arms;
   a rotary cutter coaxially affixed to one side of said wheel to be driven thereby and having teeth extending radially beyond the periphery of said wheel to penetrate the ground to a depth below the surface on which said wheel is supported;

and a blade detachably connected to the inside of one of said arms in frictional contact with one side of said rotary cutter, said blade having a pair of cutting edges either of which can be disposed in a lowermost operative position while the other is disposed in an uppermost inoperative position, both of said edges, when in said operative position, having a portion of the length of said cutting edge within the radius of action of said teeth of said cutter to be disposed in shearing relationship with said teeth of said cutter, and both of said edges of said blade when in said operative position having another portion of said cutting edge extending beyond the radius of action of said teeth of said cutter to sever material skipped by said teeth of said cutter, said blade being arranged to be positionable, by movement of said handle to a driving position, to penetrate the ground to a depth below the surface on which said wheel is supported, one of said edges of said blade being adapted to penetrate the ground to a depth greater than said rotary cutter.

References Cited
UNITED STATES PATENTS

| | | | |
|---|---|---|---|
| 1,970,827 | 8/1934 | Kesteren | 172—16 X |
| 2,212,057 | 8/1940 | Waller | 56—256 |
| 2,252,888 | 8/1941 | Goserud | 172—16 X |

ABRAHAM G. STONE, *Primary Examiner.*

J. R. OAKS, *Assistant Examiner.*